(12) United States Patent
Monroe (10) Patent No.: US 6,518,881 B2
(45) Date of Patent: Feb. 11, 2003

(54) DIGITAL COMMUNICATION SYSTEM FOR LAW ENFORCEMENT USE

(76) Inventor: David A. Monroe, 7800 IH-10 W., San Antonio, TX (US) 78230

(*) Notice: Subject to any disclaimer, the term of this patent is extended or adjusted under 35 U.S.C. 154(b) by 0 days.

(21) Appl. No.: 09/834,583

(22) Filed: Apr. 13, 2001

(65) Prior Publication Data

US 2002/0036565 A1 Mar. 28, 2002

Related U.S. Application Data (63) Continuation of application No. 09/257,449, filed on Feb. 25, 1999.

(51) Int. Cl.[7] .................................................. G08B 1/08
(52) U.S. Cl. ....................... 340/539; 340/933; 340/936; 340/937; 701/36; 701/3.5
(58) Field of Search .............................. 340/539, 426, 340/953, 937, 936; 701/36, 3.5

(56) References Cited

U.S. PATENT DOCUMENTS 6,188,939 B1 * 2/2001 Morgan et al. ................ 701/36

* cited by examiner

*Primary Examiner*—Daryl Pope
(74) *Attorney, Agent, or Firm*—Jackson Walker L.L.P.

(57) ABSTRACT

A digital electronic communication system for use in a mobile unit such as a law enforcement vehicle provides a comprehensive, modular communications system supported by an on board CPU. The system provides audio, video, graphic, text and positioning communication capability and incorporates scanners and readers such as bar code readers, magnetic strip readers and fingerprint scanners to permit enhanced on site investigation and investigation support. Multifunctional displays, a recording system and a full function printer further enhance the functional capability of the field personnel. Global positioning signals are integrated into the system to permit location and heading detection and monitoring.

31 Claims, 4 Drawing Sheets

DIGITAL COMMUNICATION SYSTEM FOR LAW ENFORCEMENT USE

This application is a continuation of Ser. No. 09/257,449 filed Feb. 25, 1999.

BACKGROUND OF THE INVENTION

1. Field of the Invention

The subject invention is generally related to digital electronic communications equipment and is specifically directed to a mobile comprehensive multimedia digital communications system particularly well-suited for law enforcement use.

2. Discussion of the Prior Art

The use of two-way communications equipment permitting a mobile unit to communicate with a base or another mobile unit is well known. Two-way radios, for example, have been available for decades. Over the years more sophisticated communications have become available. Such systems not only permit two-way voice radio communication, but also support limited data transfer such as driver's license information, fingerprints, arrest records, and the like. Such mobile data terminals (MDT) are in relatively common use in law enforcement work, and in many cases are standard equipment in mobile units such as squad cars and the like. The MDT provide an information link between mobile units and the base for the transfer of information.

A typical MDT, such as those offered by Motorola and in widespread use, permits the transmission and printing of written information such as a "rap sheet" or the like and other limited information. These MDT are used in conjunction with the standard public service band two-way voice radio systems to provide both verbal and textual communication with the mobile units. Each MDT is permanently installed in the vehicle and the user must be seated in the vehicle in order to utilize it. This reduces the flexibility of the unit and restricts the operational performance of the field personnel. For example, when a patrol officer desires to check the registration of a vehicle after stopping the vehicle on the side of the roadway, he must first leave the squad car. He then approaches the vehicle and obtains information from the operator, and then re-enters the squad car and communicates with the dispatcher or base unit. Using currently available equipment, he typically writes all of the information on a paper while standing by the stopped vehicle, returns to the squad car and radios in the information, orally reading the written information into the radio.

The dispatcher is then responsible for keying in the information in order to initiate a search from available databases. The operator can then send the information derived from the search to the patrol officer via the MDT or communicate it orally over the two-way radio. This system is not only inefficient but also permits the introduction of errors due to the many times the information is transferred, to the pad and from the pad to the base radio operator by the officer and from the base radio officer to the system. Even more sophisticated MDTs that permit the officer in the field to directly input the information into the system via an on-board keyboard or key pad still permit the introduction of error by the transfer of data first to a pad and then to a keyboard.

Further, MDTs available in the art are of very limited scope with respect to the information which can be transmitted and received at the mobile unit. As an example, it might be desirable to obtain a visual identification of a suspect. At the present time this can only be obtained by giving an oral description of the individual over the two-way radio, obviously resulting in a limited description and not permitting a positive identification either by field personnel or the base station. Thus, the only way an accurate visual identification can be made is to take an apprehended individual to the base station. For this reason, visual identification is not confirmed in most stop-and-check situations.

More recently, laptop computers have begun replacing MDT because of the broader capability of the laptop processor. In addition, most law enforcement communication systems have been expanded to two-channel capability with one channel being utilized for historic voice communication and the second channel being reserved for data transfer. This preserves the availability of high priority voice communication while permitting simultaneous transfer of data between the base and the mobile or field unit.

Thus, as technology advances the data communications systems have progressed from a paper-to-voice-to-base-to-search-to-voice-to-action to a paper-to-processor-to-base processor-to-processor-to-action scenario. While the insertion of the processor or MDT in this system has increased the reliability of the data once it is entered into the system and has greatly increased speed of response, the opportunity for introduction of error by the officer on the scene has not been minimized since he must still visually obtain and input all information into the system. All of the improvements in technology have not reduced the potential for error for the personnel at the most stressful point in the information gathering sequence.

The National Crime Information Center (NCIC) has recognized the need to provide field personnel with better information collection tools. NCIC has stated that the current NCIC system is still using 1960's level technology to fight 1990's crime. The criminal element has surpassed the ability of the law enforcement agencies to perform. Data 911 has recently introduced an in-vehicle personal computer in an effort to address the move from MDT to laptops. The system is dash mounted and has an easy to use touch-screen, preserving some of the more desirable features of the MDT while providing more of the flexibility of the laptop. For example the Data 911 system includes the capability for digitally transmitting photographic information between the base and the mobile unit, includes built-in GPS positioning systems and has an option for a magnetic stripe and bar-code reader. The Data 911 system is the first effort to address many of the issues facing mobile unit support and information flow identified by the NCIC.

However, to date, there are not any systems which address many of the issues which continue to plague law enforcement personnel today. For example, all systems still require manual operator input in order to deliver information and initiate a response. This is not desirable when an officer is disabled or when entry of error prone data can cause an errant action on the part of the officer. While in-car systems continue to be improved and expanded in function, many of the historic limitations described above exist to the present day. It would be greatly desirable to provide a comprehensive system permitting not only oral two-way communication between a mobile unit and a base and/or other mobile units, but also the ability to capture information simultaneously as it is generated and without introducing keyboard error.

SUMMARY OF THE INVENTION

The subject invention is directed to a comprehensive, mobile, digital multimedia communication system ideally suited for law enforcement use. The system of the present invention is a highly integrated modular data system than not only provides the functional aspects of a standard MDT, but also provides enhanced functions through the use of tailored application of industry multimedia and mobile computing techniques. The system is based on standard industry rugged workstations and sensor devices packaged in an integrated system of modular construction, permitting customized equipment based on need and budgetary constraints. The system of the present invention provides a highly integrated modular data system of unique and comprehensive functionality.

In the preferred embodiment of the invention the MDT is replaced with customized laptop type personal computer adapted to be connects to power, transmission and data support systems located in a vehicle such as, by way of example, a squad car or the like.

In its preferred form, the system will replace outmoded MDT hardware and the more recent, though limited laptop systems such as those offered by Motorola, Data 911, ALERT by Texas Transportation Institute and the systems promoted by NCIC and the like. The system provides a full service PC function in the vehicle and includes a reference map library with moving map function and route generator. Motion video display is provided with full recording and archiving capability. A full keyboard is provided, as well as stylus writing capability in order to permit data entry directly onto the system which not only reduces error but also assures immediate archiving and capability for immediate transmission to a central processor and to the dispatcher. A multifunction video display screen displays moving video, still images, textual information and graphic information in a multi-window format. A multi-function printer supports report generation, receipt of textual, graphic and other visual information and can be used to produce on-site printed materials such as, by way of example, citations and the like. A magnetic card reader and bar code reader permit accurate electronic capture of information without the likelihood of transfer error.

In addition, the novel monitoring capability of the system of the subject invention provides automatic detection and identification of emergency situations, with the capability of initiating an appropriate response without officer intervention. This is particularly critical in an "officer disabled" situation. The situational information is introduced into the system and transmitted to the dispatcher on a real time basis. The system also incorporated an on-board global positioning systems (GPS) to provide emergency monitoring and tracking of the unit in critical situations.

As an example of how such a system would enhance the ability of a field law enforcement officer in dealing with an emergency situation, when an officer stops a vehicle for a moving violation he typically gets out of the vehicle and approaches the driver of the vehicle to obtain information such as a driver's license, current registration and insurance verification. Under the prior art system, the officer will take all of this information back to his vehicle and using the two-way radio and MDT, will transmit the information to a base unit. Typically, he will read much of the information into the radio and perhaps key in certain alphanumeric information on the MDT. Using the present invention, the officer will be able to have the same manual options available in the prior art systems. In addition, he will be able to key in all of the alphanumeric information, rather than read any of it and transmit it orally, and in the preferred embodiment he will be able to "swipe" the magnetic stripe of so-equipped driver's licenses through the magnetic card reader to electronically capture and transmit the information without manually entering it, reducing the likelihood of error. He can also use the magnetic card reader to transmit medical information contained on a medical card in the event of a medical emergency. Car registration and insurance information can also be provided in this manner. The system would also permit VIN numbers and other data to be bar coded, for example on the dashboard VIN plate, and the wireless barcode reader could electronically receive and transmit this information directly from the plate, again reducing the likelihood of transmission error.

The system of the present invention not only minimizes the steps required to transmit critical information, but also reduces the likelihood of copying and transmission errors. In addition, by having all of the information in a digital, direct transmission format, the officer is able to transmit the information in a more efficient manner, permitting him to be less distracted from an emergency or high risk situation.

The system has even wider spread advantages and applications in other emergency situations where a suspect is being pursued, or an injury accident has occurred and the like. For example, the on board GPS system permits the base unit to track and monitor the whereabouts of the vehicle at any time and permits the operator of the vehicle to identify his location, heading and distance from a desired location on a real time basis without vehicle operator interface. Video equipment provided in the vehicle permits real time transmission of situation information, as well as archival recordings. The reference map library and the moving map function permit updates of route information on the multifunction image display screen and complete and accurate recording of the past route of the vehicle. Suspect data and other information can be transmitted to both the screen and the printer. In the preferred embodiment, a fingerprint scanner may be incorporated in the system to provide immediate positive identification of a suspect.

The comprehensive digital system of the subject invention can also be used to control on board electrics such as, by way of example, the siren, flashing lights and other indicators. Sensors may be positioned to monitor such things as deceleration and acceleration functions, speed and tilt, particularly useful in chase situations, both for real time monitoring and for historic retrieval purposes. The historical record of such information as the location, speed and control of the vehicle throughout a pursuit situation, the status of indicators such as sirens, lights and the like, could be extremely valuable if a serious event such as an accident occurs during a chase. Digitized audio from the radio or other sensors could also be recorded. Such information would be very beneficial in reconstructing the events leading up to a catastrophic occurrence.

The system of the present invention is also designed to provide on board terminal access for state, local and national NCIC databases, e-mail and facsimile transmission and reception and communications over private radio band, CPDP, and/or cellular link. In addition, emergency activation signals may be transmitted with the touch of a button or entry of a code or an encrypted message. For example, if back up is needed. A signal may be transmitted to the base unit by entering a code or activating a signal by the press of a button, and the base unit will be able to immediately locate the closest available back-up units by utilizing the GPS information from the sending unit and the other mobile units in the vicinity. A back-up unit can then determine the precise location of the sending unit, the shortest route and the estimated time of arrival by using the map library and the GPS information.

If an emergency signal is received by the base unit, the base unit can also remotely "pull" or access information from the mobile unit such as location, view images, audio surveillance and the like. The base unit can also "push" or transmit information to the remote vehicle such as audio, siren control, light control, and the like. This could allow base station personnel to substantially assist an officer in an emergency or distress situation without being physically present and in many cases without sending a signal or "tip-off" to a perpetrator.

The subject invention provides a comprehensive mobile digital communication system greatly enhancing the safety, efficiency and functional capability of officers in the filed, while at the same time providing a base unit with critical data to protect and support the mobile unit. The system is of a modular design, permitting the system to be incorporated into law enforcement work while keeping in mind budget constraints. A basic system providing a PC (laptop) computer base, communications links, printer and reader capability, is competitively priced with a current radio/MDT system, with much greater capacity and functionality.

It is, therefore, an object and feature of the subject invention to provide a comprehensive digital communications system for use by a mobile unit.

It is another object and feature of the subject invention to provide a mobile communications system for supporting law enforcement personnel to replace the current MDT based systems.

It is also an object and feature o the subject invention to provide a modular communications system that can be upgraded at will, depending on need and budgetary constraints.

It is a further object and feature o the subject invention to provide a communications system with redundancy over several different wireless communications media such as, by way of example, Public Service, CDPD, cellular and the like, whereby the most reliable and/or cost effective services are use in a hierarchy or prioritized order, based on set criteria, with automatic back-up services.

It is yet another object and feature of the subject invention to provide a communications system capable of accepting and transmitting digital information in the form of magnetic stripe and/or bar encoding systems and the like.

It is an additional object and feature of the subject invention to provide a communications system permitting on board access to location, time and route information and/or monitoring and tracking data to the base unit.

It is another object and feature of the subject invention to provide a communications system giving field personnel real time access to local, state and national databases for identification purposes, including real time, on site, fingerprint identification.

Other objects and features of the invention will be readily apparent from the drawings and the following detailed description of the preferred embodiment.

DETAILED DESCRIPTION OF THE PREFERRED EMBODIMENTS

Figure 1:
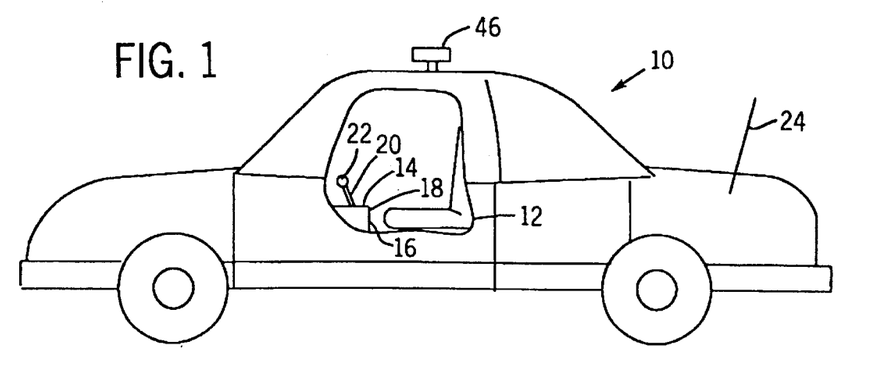
FIG. 1 is a cutaway view of a typical squad car incorporating the modular digital communication system of the subject invention.

A typical squad car 10 is shown in FIG. 1, cutaway at 12 to show the interior of the car. The control module 14 for the communication system of the preferred embodiment is designed to be installed in the vehicle console and is designed to take approximately the same space as the prior art MDTs. As better shown in FIG. 2, the control module 14 of the preferred embodiment includes a central processing unit 16, an input device 18, a multifunctional display screen 20 and a transceiver for wireless equipment, as indicated by the antenna 22. The control module 14 is connected through a transceiver 26 (see FIG. 2) to the car radio system 28 (see FIG. 3) for transmitting data to a base unit (not shown) in typical manner via the radio antenna 24. Of course, cellular transmission or other communication link can be utilized in lieu of the private band radio link without departing from the scope and spirit of the invention. In the preferred embodiment, a back up transmission scheme is utilized, using the radio hook up as the primary transmission system with a cellular hook up as back up.

Figure 4:
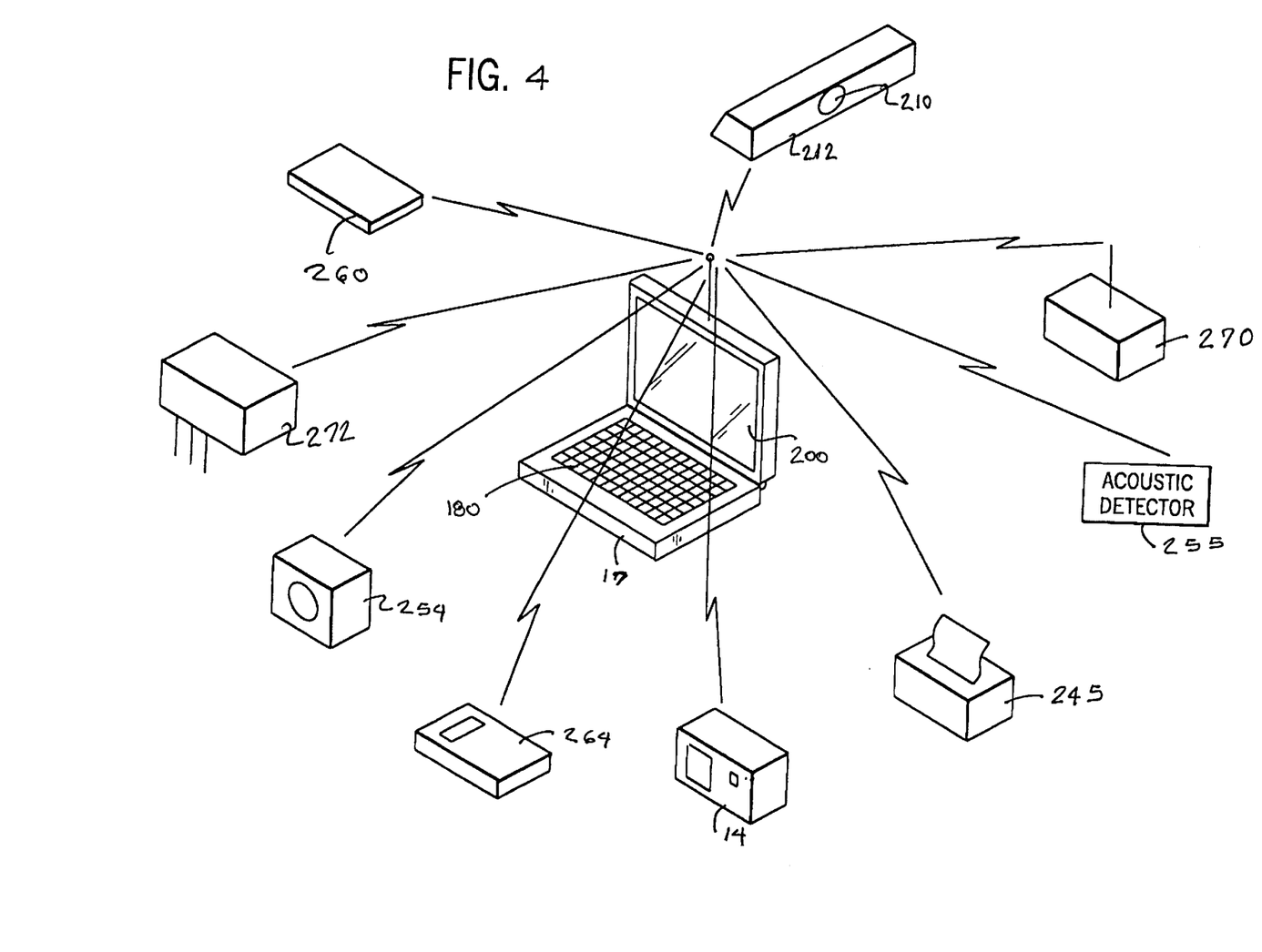
FIG. 4 is an illustration of the versatility of the combination of components controlled by and in communication with the system utilizing a wireless configuration.

The control module 14 may be permanently installed in the console, or may be portable and handheld, adapted to communicate via wireless transmission scheme with a console computer 17 as shown in FIG. 4. When the portable unit is used, the central processing unit for controlling the module 16 is provided by the console computer 17. Typically, a standard off-the-shelf laptop computer can be used to provide the cpu for the system. Of course, it will be understood that while the laptop computer greatly increases the versatility of the overall system, providing full personal computer capability, the control module of the subject invention is fully functional as a stand alone unit with a dedicated internal cpu. However, it will be recognized that it is redundant and an unnecessary expense to provide a dedicated cpu when the laptop computer is incorporated as part of the system.

Figure 2:
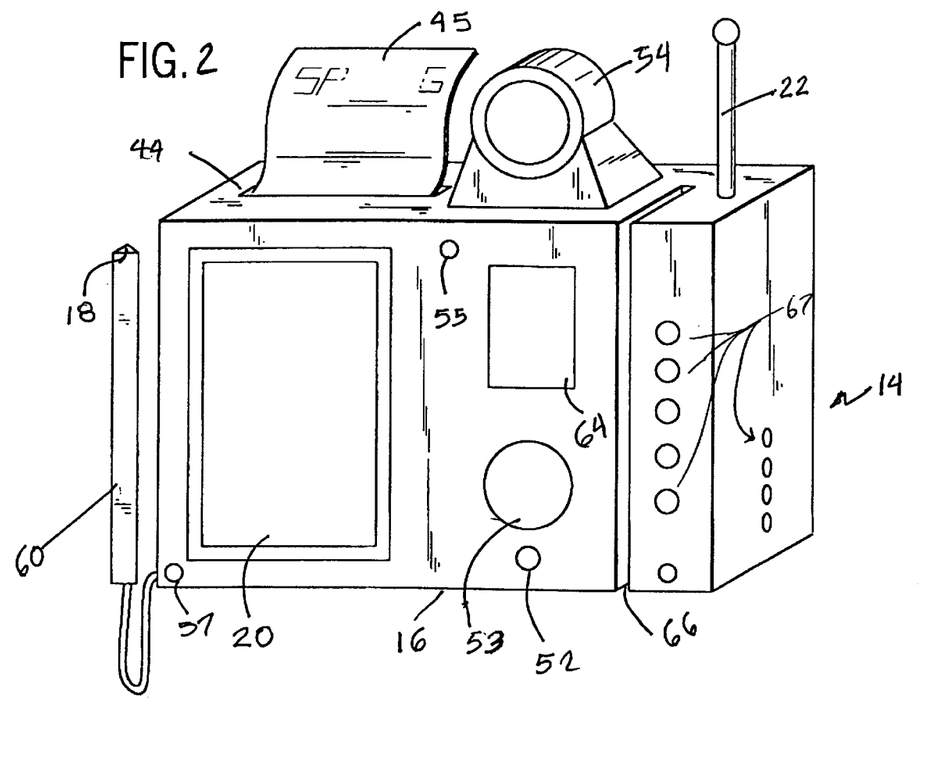
FIG. 2 is a perspective view of a console unite of the preferred embodiment of the invention.

As shown in FIG. 2, the preferred embodiment of the module is a portable, handheld device, about the size of a mini-camcorder, and provides law enforcement personnel with greatly expanded capability for on site investigation and communication. The module includes a PDA and video screen 20. The screen 20 will permit the receipt of both textual and visual information without printing. For example, a file photograph of a suspect could be transmitted directly to the site from a base station. The module also includes a printer 44 whereby information may be provided in a hard copy. Further, it is possible that citations could be printed in this method with a record being sent immediately to the base system, eliminating paperwork and copies and expediting the entry of citations into the system for tracking purposes. A fingerprint scanner 64 is provided for scanning fingerprints on site and providing near instantaneous preliminary matches. The preferred embodiment of the invention is also equipped with a magnetic stripe reader 66 capable of reading driver's license information in those states using magnetic information stripes on the license. The magnetic stripe reader can also be used for processing on-site ticket payments and reading medical information cards and the like. The stylus 18 is multi-function. The tip 18 can be used to "write" textual information on a touch sensitive screen 20 and the flat edge 60 is a bar code reader. The bar code reader can be used to read in such information as the bar coded VIN plate on the dash of an apprehended vehicle. Other bar coded information may also be input into the system this way.

A video camera 54 is provided to capture video on site and on a real time basis. The video may be instantly transmitted to the base station via the wireless interface, may be stored on site and either displayed as a live image on the screen 20 or recalled for later display or transmission. A microphone or other audio sensor 52 is provided to pick up sounds and speech for recording, transmission and playback. The speaker 53 is provided for voice communications with the base as well as playback of recorded audio. Other sensors 55, 57 may be provided as desired.

All of the control functions are self-contained as indicated by the control buttons 67.

Figure 3:
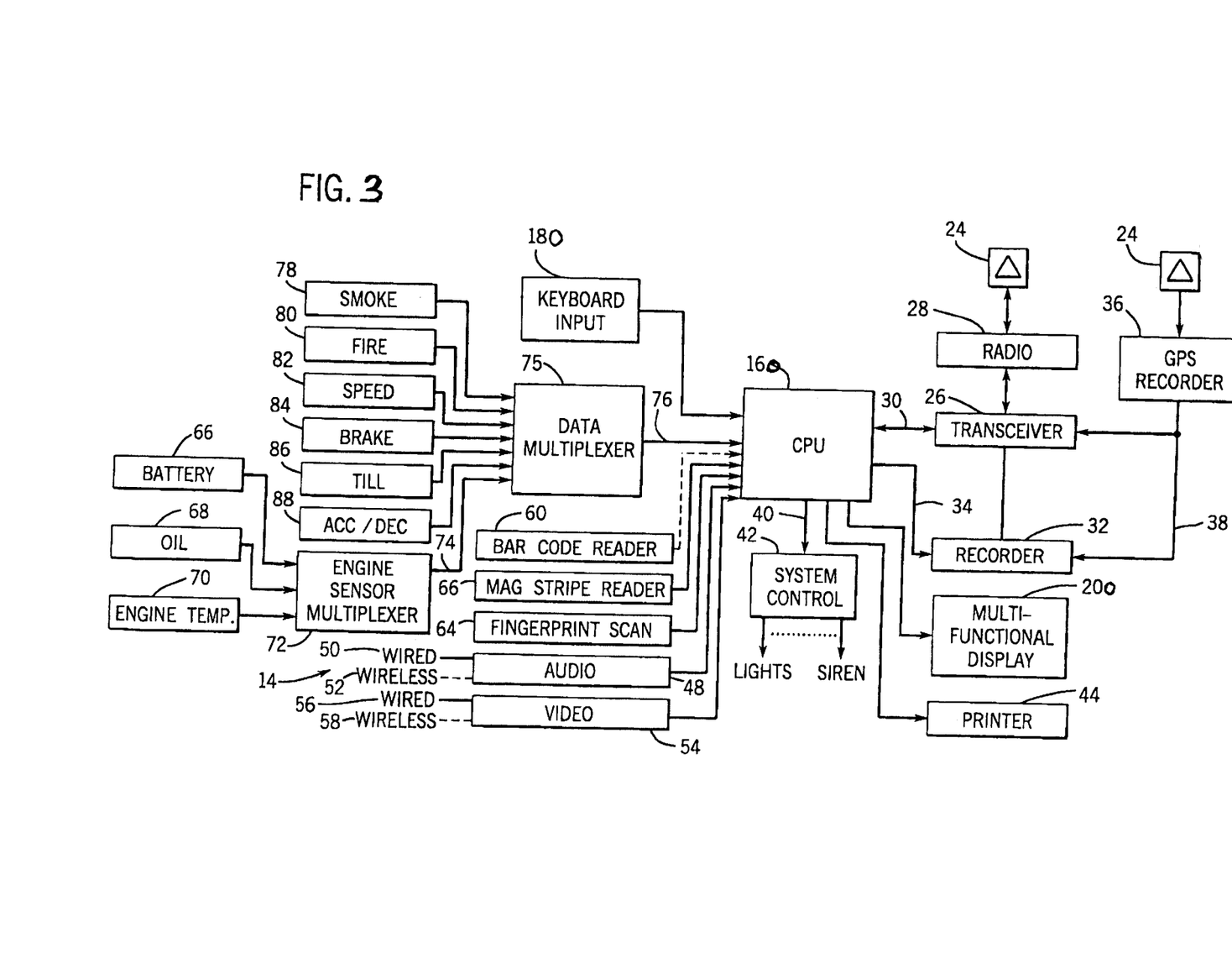
FIG. 3 is a block diagram of the system.

As is better shown in FIG. 3, the central processing unit or cpu 160 is adapted for receiving inputs from a plurality of system modules and for transmitting data signals to a plurality of system receivers, displays and recorders. The modular design is one of the most significant features of the system of the subject invention. This permits modification and enhancement of both the data collection apparatus and the display and transmission apparatus, depending on scope of need and possible budgetary constraints. The comprehensive system shown in FIGS. 2 and 3 incorporates a large variety of the available data gathering devices useful in law enforcement work. As specifically shown in FIG. 3, the unit of FIG. 2 is combined with a laptop computer, and therefore includes the additional keyboard input device 180. The addition of the computer permits expansion of the system as both a communications device and a monitoring and control device. For example, and as will be explained in detail herein, vehicle performance may be monitored, emergency warning systems may be activated both on site and from a remote base location, and location and speed of th unit may be monitored, as well as other functions. Any combination of these and other devices may be used in conjunction with the invention.

In the embodiment of FIG. 3, the central processing unit or CPU 160 is the heart of the system and is a typical laptop computer configuration which is mounted in the vehicle console for easy access, with an integral keyboard 18 and an integral display or monitor 200. This control module is installed in place of and replaces the prior art MDT. All of the output to the base unit is sent via output line 30 to a transceiver 26 and is transmitted via the vehicle radio 28 and antenna 24 to the base unit, in the well known manner.

In the preferred embodiment, an on-board recorder 32 is provided in the vehicle and all or selected information may be input via line 34 and recorded. It is desirable to include on-board global positioning capability, as indicated by the GPS receiver 36 which emits and receives position signals via antenna 24. In its preferred form, the GPS system includes a time signal component as well. This permits the recorder 32 to track any recorded information with location and time of event, as indicated by input line 38. The GPS signal may also be entered into the CPU via transceiver 26, whereby the field personnel may utilize the information to confirm vehicle location, distance to a remote location and estimated time of arrival, and the like. The GPS data may also be transmitted to the base unit via radio 28 to provide tracking and monitoring information relating to the vehicle whereabouts.

As further illustrated in FIG. 2, the CPU can be used to control and monitor the on-board electronics, such as activation and deactivation of the siren 210, flashing lights 212, public address (PA) audio, emergency signals to base and the like. As previously discussed, the computer bases system can also be used to control and provide the central processing capability for the PDA module 14. Operation and control information maybe input by keyboard entry via keyboard 180, utilizing either dedicated keys, or by typing in specific commands. Other discrete components such as a printer 345, either on-board or remote, a digital camera 254, an acoustic or other event detector 255, a bar code scanner 260, an independent fingerprint scanner 264, a vehicle sensor interface 270 and other systems as, as graphically indicated at 272, may be controlled and monitored via the wireless transmission system, providing a very versatile law enforcement tool. It is also possible to incorporate a mouse/ball input device in conjunction with a Windows type operating system to use a point-and-click regimen for activating various functions.

With further reference to FIG. 3, in the preferred embodiment the system control inputs to the CPU 160 are output via line 40 to a system control module 42. The system control module 42 sends activation and deactivation signals to various equipment on the vehicle, such as, by way of example, the siren 210 (FIG. 4), light bar 212 (also FIG. 4), flashing running lights (not shown) and the like. The keyboard and other manual input devices can also be used to activate emergency signals to be transmitted via the transceiver 26 and radio 28 to the base unit to inform the base of certain requests for support, such as, by way of example, "back-up needed", "officer down", "vehicle disabled" and the like. This expedites the transmission of such information by permitting automatic transmission once the signal is triggered at the keyboard 18 or by the point-and-click system at the control module 14 or computer 17.

It is also possible to send more detailed information to the mobile unit when utilizing the comprehensive system of FIGS. 3 and 4 of the invention. As stated, in the preferred embodiment an on-board printer 44 is provided. This printer is responsive to information transmitted from the base unit via radio 28 or from field personnel via the keyboard 180 or other input devices, as will be explained. The printer permits detailed graphic and text information to be transmitted and received, such as maps, location detail, biographical information about a suspect and the like. In addition, the field personnel can print any information initiated at the mobile unit at the keyboard 180 or from other input devices.

Among the most important features of the present invention is the ability to expand the amount of data available to the field personnel and the types of data that can be captured and transmitted to the base by the field personnel. The preferred embodiment of the invention incorporates a plurality of additional signal producing modules in order to accomplish this objective. An audio module 48 is provided for providing a digitized audio signal to the CPU 160, from which the signal may be transmitted via radio 28 to the base, and/or recorded at the on board recorder system 32. In the preferred embodiment a wire microphone or pickup 50 is provided in the vehicle and a wireless microphone 52 may be worn on the body of the field personnel. The system also incorporates one or more video generators or cameras as part of the video module 54. Again both a wired device 56 and a wireless device 58 are supported by the system. As shown in FIG. 1, an integral short range antenna and receiver system 22 is provided for supporting the wireless devices, as will be further explained. The video signal from module 54 is input to the CPU 16 and may be displayed at the multifunctional display 20 on module 14 and/or the computer display 200, recorded in the recording system 32 and/or transmitted via radio 28 to the base unit.

With the digitized system of the present invention it is also possible to greatly expand the collection, dissemination and use of critical functional data relating to the condition and performance of the vehicle. As shown in FIG. 3, all of the typical engine sensors such as, by way of example, the battery charge sensor 66, the oil pressure sensor 68 and the engine temperature sensor 70 may be collected and input to the CPU 160 for display at the display unit 20, recordation at the recorder system 32 and/or transmission to the base unit via radio 28. It is desirable that this information be compressed in order to reduce the amount of transmission, processing and storage capacity required to monitor this function. In the preferred embodiment a dedicated engine sensor multiplexer 72 is provided for scanning and sequentially collecting the information from the various engine sensors to produce a multiplexed signal on line 74. This can be entered directly into the CPU 160, or as in the preferred embodiment, further combined with other sensors to provide a single, digitized, comprehensive data signal output at line 76 by data multiplexer 75.

Other sensors may be supplied in modular form, on an as desired or as needed basis. In the preferred embodiment a smoke detector 78 and a fire detector 80 are provided to monitor the presence of fire in the vehicle. Performance sensors are also provided to monitor the speed, acceleration/deceleration, braking and leveling conditions of the vehicle as indicated by the speed sensor 82, acc/dec sensor 84, brake sensor 86 and tilt sensor 88, respectively. The multiple condition, performance and engine function sensors provide real time data to the operator at the display unit 200, archival records at the recorder system 32 and monitoring capability at the base 28, permitting corrective action to be taken when necessary and providing a historical record of events related to the vehicle.

The system of the preferred embodiment permits the field personnel to have immediate real time access to state, local and national (NCIC) databases, will support E-mail and fax transmissions in addition to all current MDT functions. In the preferred form, the CPU is a full function personal computer capable of supporting industry standard software applications such as an address book and word processing, as well as custom law enforcement applications such as customized arrest support, investigation support, traffic accident support and burglary/theft support, as well as other incident support.

The display unit and printer provide ready map support and the GPS system permits ready location identification, permitting display of the current location on a map, display of a desired location on the map and route and timing information, including tracking where desired. This function is particularly useful in back-up situations for both locating and dispatching the closest back-up support vehicle.

The enhanced video available with the system of the preferred embodiment will support both natural light video as well as infrared night vision and the like. The recorder system can include a playback unit, where the recorded video (and audio) information may be displayed directly on the on board display unit.

The display unit can support incoming graphic information from a base unit, such as, by way of example, suspect photos or sketches, situation photos such as building facades, layouts, floor plans and the like, driver's license photos, fingerprint information and the like.

The printer is a full function printer and can be used for printing any transmitted text information, as well as for printing traffic citations, summons and other materials immediately, on site.

All information collected by the CPU may be maintained in a terminal log, particularly a transaction log, providing both the field personnel and the base unit a permanent record of key events.

Figure 5:
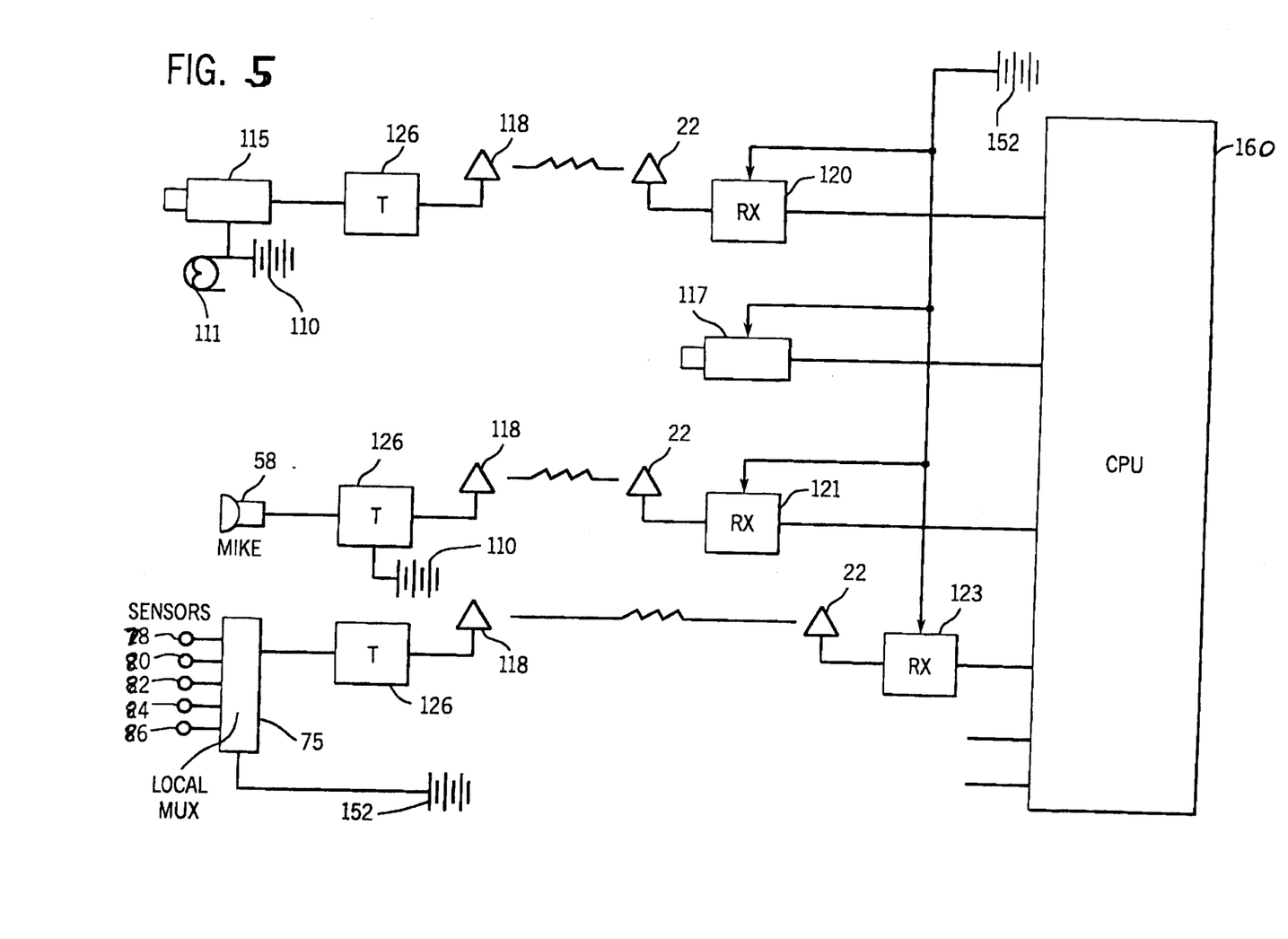
FIG. 5 is an expansion of the wireless features of the system.

FIG. 5 shows the components of a typical wireless hook up. The audio and video modules shown correspond to the audio module 48 and the video module 54 shown in FIG. 3 and in the preferred embodiment comprise a wireless microphone 58 and both a wireless camera 115 and a hardwired camera 117. In the preferred embodiment, the microphone 58 will comprise a collar mike worn on the collar of the shirt and hardwire to a dedicated transmitter unit 126 for sending a short range signal via a dedicated antenna 118 to the CPU antenna 22 and audio receiver 121. A separate power supply such as a battery pack 110 is provided.

Wireless camera 115 also includes a transmitter 126 and integral antenna 118 for transmitting the video signal to the CPU via antenna 22. In the preferred embodiment the wireless camera also includes an illumination source 111 for lighting the area in the range of the camera 115. A hardwired camera 117 may also be supplied. For example, this camera may be mounted directly on the dash or within the light bar 46 (see FIG. 1).

The various sensors 78, 80, 82, 84, 86 and the like are typically hardwired to the system. However, in retrofit installations, or when added as an enhancement module to an existing system, it may be desirable to use the wireless installation shown in FIG. 5. In this case, each of the sensors are hardwired to the data multiplexer 75 which produces a single, combined output to be input into the associated transmitter 126 and wirelessly transmitted via the associated antenna 118 to a receiver 123. The power supply for the wireless sensor system is typically the vehicle power supply 152, as with the control module.

Various sensor, reader and peripheral modules may be added as desired using the methods and techniques taught herein. The digital communications system of the subject invention provides comprehensive communications support for mobile units, greatly enhancing the functionality of the units while at the same time improving efficiency and safety. While specific embodiments and features of the invention have been described in detail herein, it should be readily understand that the invention includes all modifications and enhancements within the scope and spirit of the following claims.

What is claimed is:

1. A comprehensive mobile digital multimedia communications system for providing digital communications support between a mobile unit, the mobile unit including peripheral support equipment, and a remote base/dispatcher or another remote mobile unit, the system adapted for transmitting audio, video, textual and graphic data to and from the mobile unit and for receiving audio, video and textual data from the base or other remote mobile unit, the system comprising:

a. a digital processing control module for receiving input data from the mobile unit and/or the remote base unit and processing the input data;

b. a multimedia output device including a multifunction display and a multifunction printer associated with the control module for producing the input data transmitted from the base unit to the control module in a useable form at the mobile unit;

c. a multifunction input device associated with the control module for generating local input data for use at the control module and for transmission to the base unit;

d. an output transmitter device for transmitting the local input data to the remote unit;

e. a receiver for accepting input data from the remote unit and inputting it into the control module; and f. a peripheral control device for operating said peripheral support equipment in response to input from the remote unit and the control module whether input at the multifunction input device or preprogrammed in the control module.

2. The system of claim 1, wherein said control module is a central processing unit.

3. The system of claim 1, wherein said multifunction input device includes a full function keyboard.

4. The system of claim 1, wherein said multifunction input device includes a magnetic strip reader for reading the information encoded on the magnetic strip of a card.

5. The system of claim 1, wherein said multifunction input device includes a bar code reader.

6. The system of claim 1, further including a wireless receiver associated with control module and a wireless input device, the wireless input device including a transmitter for transmitting input data to the control module receiver.

7. The system of claim 1, wherein said multifunction input device includes an audio microphone.

8. The system of claim 1, wherein said multifunction input device includes a video signal generator.

9. The system of claim 8, wherein said video signal generator is a video camera.

10. The system of claim 8, wherein said video signal generator is an infrared night vision signal generator.

11. The system of claim 8, further including an illumination source associated with the video signal generator.

12. The system of claim 8, further including a wireless receiver associated with the control module and wherein the video signal generator is wireless input device, the wireless video signal generator including a transmitter for transmitting input data to the control module receiver.

13. The system of claim 7, further including a wireless receiver associated with the control module and wherein the audio microphone is a wireless input device, the audio microphone including a transmitter for transmitting input data to the control module receiver.

14. The system of claim 1, further including condition sensors associated with the mobile unit and adapted for generating condition signals to be input to the control module.

15. The system of claim 14, wherein said condition sensors include a smoke/fire detector.

16. The system of claim 14, further including performance sensors adapted for generating performance condition signals to be input to the control module.

17. The system of claim 16, wherein said performance sensors include a speed sensor.

18. The system of claim 16, wherein said performance sensors include an acceleration/deceleration sensor.

19. The system of claim 16, wherein said performance sensors include a brake action sensor.

20. The system of claim 14, further including engine operating condition sensors for generating engine operating condition signals adapted to be input into the control module.

21. The system o claim 1, further including a recording device for recording data output by the control module.

22. The system of claim 21, the recording device adapted for providing a playback input signal to the control module.

23. The system of claim 1, further including a system control device adapted for providing activation and deactivation signals to onboard system, the system control device adapted for receiving input signals from the control module.

24. The system of claim 23, the mobile unit including a siren and the system control device adapted for providing a siren activation signal and a siren deactivation signal.

25. The system of claim 23, the mobile unit including emergency light systems and the system control device adapted for providing an emergency light activation signal and an emergency light deactivation signal.

26. The system of claim 1, further including a global positioning system associated with the mobile unit and adapted for inputting a global positioning signal into the control module.

27. The system of claim 26, wherein the global positioning signal includes location, heading and time components.

28. The system of claim 27, further including a recording device for recording data output by the control module, the recording system including a global positioning track overlay for tying the recorded information to the global positioning location and time components.

29. The system of claim 1, further including printer associate wit the control module for printing selected data from the remote unit and selected data produced by the onboard input device.

30. The system of claim 1, wherein the control module is a full function personal computer capable of supporting standard industry software.

31. The system of claim 1, further including a fingerprint scanner for providing a digitized fingerprint data signal to the control module, whereby positive identification may be made on site.

* * * * *